(12) United States Patent
O'Donncha et al.

(10) Patent No.: US 12,169,776 B2
(45) Date of Patent: Dec. 17, 2024

(54) SUPERRESOLUTION AND CONSISTENCY CONSTRAINTS TO SCALE UP DEEP LEARNING MODELS

(71) Applicant: International Business Machines Corporation, Armonk, NY (US)

(72) Inventors: Fearghal O'Donncha, Galway (IE); Ambrish Rawat, Dublin (IE); Sean A. McKenna, Reno, NV (US); Mathieu Sinn, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1037 days.

(21) Appl. No.: 17/121,933

(22) Filed: Dec. 15, 2020

(65) Prior Publication Data
US 2022/0188629 A1    Jun. 16, 2022

(51) Int. Cl.
*G06N 3/08*      (2023.01)
*G06N 3/04*      (2023.01)

(52) U.S. Cl.
CPC ............. *G06N 3/08* (2013.01); *G06N 3/04* (2013.01)

(58) Field of Classification Search
CPC ............ G06N 3/04; G06N 3/08; G06N 3/044; G06N 3/045; G06T 3/4046; G06T 3/4053; G06F 17/13
See application file for complete search history.

(56) References Cited

U.S. PATENT DOCUMENTS

| | | | |
|---|---|---|---|
| 9,760,805 B2 | 9/2017 | Wang et al. | |
| 10,331,814 B2 | 6/2019 | Meneghin et al. | |
| 10,909,744 B1* | 2/2021 | Stuyck | G06N 3/045 |
| 2015/0006125 A1 | 1/2015 | An et al. | |
| 2015/0220668 A1* | 8/2015 | Langemyr | G06F 30/23 |
| | | | 703/2 |

(Continued)

FOREIGN PATENT DOCUMENTS

| | | | | |
|---|---|---|---|---|
| CN | 103473752 A | * | 12/2013 | |
| EP | 3651462 A1 | * | 5/2020 | G06F 3/011 |
| GB | 2493050 A | * | 1/2013 | A63F 13/12 |

OTHER PUBLICATIONS

Zhang, Zheyan, et al. "MeshingNet: A new mesh generation method based on deep learning.", pp. 1-14, arXiv:2004.07016v1 ( 2020). (Year: 2020).*

(Continued)

*Primary Examiner* — Andrew L Tank
(74) *Attorney, Agent, or Firm* — Amin, Turocy & Watson, LLP

(57) ABSTRACT

Techniques of facilitating deep learning model rescaling by computing devices. In one example, a system can comprise a processor that executes computer executable components stored in memory. The computer executable components can comprise: a rescaling component; and a forecasting component. The rescaling component can determine a scaling ratio that maps low mesh resolution predictive data output by a partial differential equation (PDE)-based model for a sub-domain to high-resolution observational or ground-truth data for a domain comprising the sub-domain. The forecasting component can generate high mesh resolution predictive data for the domain with a machine-learning model using input data of the PDE-based model and the scaling ratio.

20 Claims, 7 Drawing Sheets

(56) References Cited

U.S. PATENT DOCUMENTS

| | | | |
|---|---|---|---|
| 2018/0189647 A1* | 7/2018 | Calvo | G06N 3/08 |
| 2019/0122411 A1* | 4/2019 | Sachs | G06T 7/90 |
| 2019/0316309 A1 | 10/2019 | Wani et al. | |
| 2020/0074295 A1 | 3/2020 | O'Donncha et al. | |
| 2020/0349301 A1* | 11/2020 | Ashdown | G06F 30/27 |
| 2021/0034978 A1* | 2/2021 | Kato | G06N 3/04 |
| 2021/0064802 A1* | 3/2021 | Albert | G06N 3/047 |

OTHER PUBLICATIONS

E. Rocha Rodrigues, I. Oliveira, R. Cunha and M. Netto, "DeepDownscale: A Deep Learning Strategy for High-Resolution Weather Forecast," 2018 IEEE 14th International Conference on e-Science (e-Science), Amsterdam, Netherlands, 2018, pp. 415-422, doi: 10.1109/eScience.2018.00130. (Year: 2018).*

S. Botelho et al., "Deep Generative Models that Solve PDEs: Distributed Computing for Training Large Data-Free Models," 2020 IEEE/ACM Workshop (MLHPC) and Workshop (AI4S), GA, USA, 2020, pp. 50-63, doi: 10.1109/MLHPCAI4S51975.2020.00013. (Year: 2020).*

Pakravan, Samira, et al. "Solving inverse-PDE problems with physics-aware neural networks.", pp. 1-18, arXiv:2001.03608v1 (2020). (Year: 2020).*

C. Jiang et al., "Meshfreeflownet: A Physics-Constrained Deep Continuous Space-Time Super-Resolution Framework," SC20: International Conference for High Performance Computing, Networking, Storage and Analysis, Atlanta, GA, USA, 2020, pp. 1-15, doi: 10.1109/SC41405.2020.00013. (Year: 2020).*

Pfaff, Tobias, et al. "Learning mesh-based simulation with graph networks.", pp. 1-16, arXiv preprint arXiv:2010.03409v1 (2020). (Year: 2020).*

Bar-Sinai et al., "Learning data-driven discretizations for partial differential equations," PNAS, Jul. 30, 2019, vol. 116, No. 31, pp. 15344-1534.

Freund et al., "DPM: A deep learning PDE augmentation method (with application to large-eddy simulation)," arXiv:1911.09145v1 [cs.LG] Nov. 20, 2019; 28 pages.

Dong et al., "Image Super-Resolution Using Deep Convolutional Networks," IEEE Transactions on Pattern Analysis and Machine Intelligence; Year: 2016, vol. 38, No. 2, 13 pages.

Haehnel et al., "Using Deep Learning to Extend the Range of Air Pollution Monitoring and Forecasting," Journal of Computational Physics, 2020; arXiv:1810.09425v3 [cs.LG], Jan. 26, 2020, 14 pages.

Vandal et al., "DeepSD: Generating High Resolution Climate Change Projections through Single Image Super-Resolution," Computer Vision and Pattern Recognition; arXiv:1703.03126v1 [cs.CV], Mar. 9, 2017, 9 pages.

Dong et al., "Learning a Deep Convolutional Network for Image Super-Resolution," Computer Vision—ECCV 2014. ECCV 2014. Lecture Notes in Computer Science, vol. 8692, 16 pages.

"Adaptive learning numerical weather forecasting model," IPCOM000015255D; Jun. 20, 2003, 9 pages.

Physical Sciences Laboratory, "NCEP/NCAR Reanalysis 1: Summary," https://psl.noaa.gov/data/gridded/data.ncep.reanalysis.html, 4 pages.

* cited by examiner

SUPERRESOLUTION AND CONSISTENCY CONSTRAINTS TO SCALE UP DEEP LEARNING MODELS

BACKGROUND

The subject disclosure relates to computing devices, and more specifically, to techniques for rescaling deep learning models by computing devices.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate deep learning model rescaling by computing devices are described.

According to an embodiment, a system can comprise a processor that executes computer executable components stored in memory. The computer executable components can comprise: a rescaling component; and a forecasting component. The rescaling component can determine a scaling ratio that maps low mesh resolution predictive data output by a partial differential equation (PDE)-based model for a sub-domain to high-resolution observational or ground-truth data for a domain comprising the sub-domain. The forecasting component can generate high mesh resolution predictive data for the domain with a machine-learning model using input data of the PDE-based model and the scaling ratio.

According to another embodiment, a computer-implemented method can comprise determining, by a system operatively coupled to a processor, a scaling ratio that maps low mesh resolution predictive data output by a partial differential equation (PDE)-based model for a sub-domain to high-resolution observational or ground-truth data for a domain comprising the sub-domain. The computer-implemented method can further comprise generating, by the system, high mesh resolution predictive data for the domain with a machine-learning model using input data of the PDE-based model and the scaling ratio.

According to another embodiment, a computer program product can comprise a computer readable storage medium having program instructions embodied therewith. The program instructions are executable by a processor to cause the processor to perform operations. The operations can include determining, by the processor, a scaling ratio that maps low mesh resolution predictive data output by a partial differential equation (PDE)-based model for a sub-domain to high-resolution observational or ground-truth data for a domain comprising the sub-domain. The operations can further include generating, by the processor, high mesh resolution predictive data for the domain with a machine-learning model using input data of the PDE-based model and the scaling ratio.

DETAILED DESCRIPTION

Figure 1:
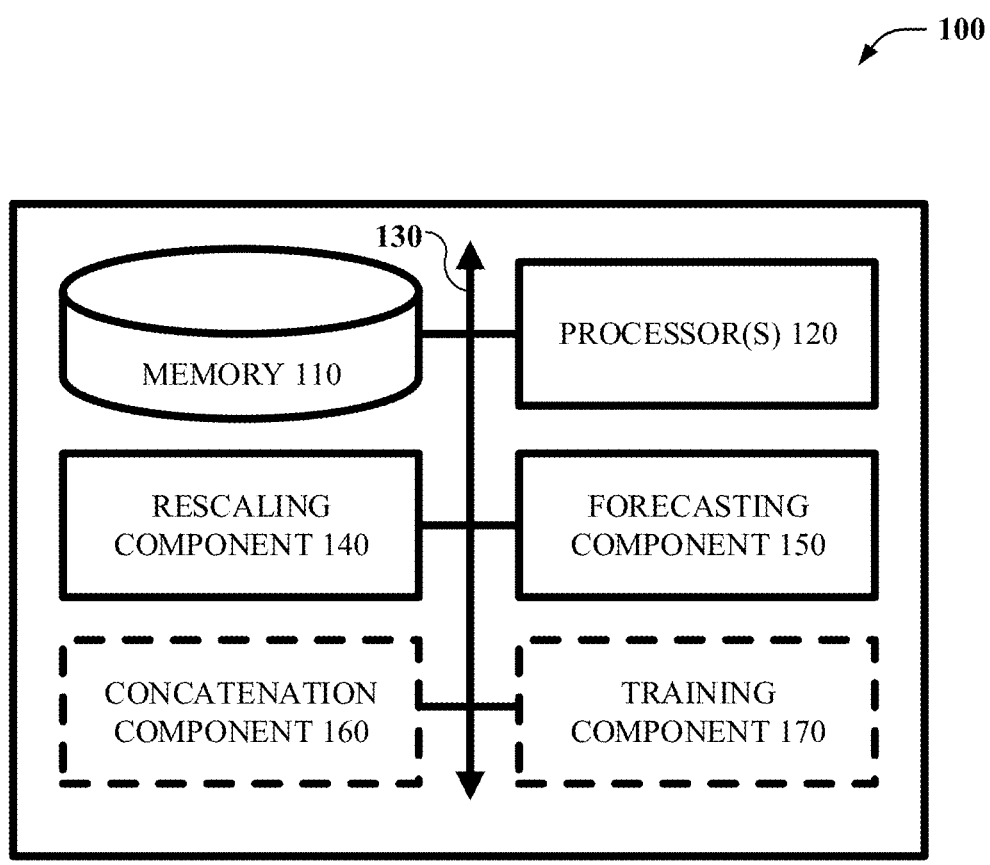
FIG. 1 illustrates a block diagram of an example, non-limiting system that can facilitate deep learning model rescaling by computing devices, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Solving partial differential equations (PDEs) underlies much of applied mathematics, ranging from air pollution forecasting, computer graphics, oceanic engineering, and structural engineering, to and weather prediction. Some approaches to such prediction problems can utilize numerical solvers for the PDEs that can involve substantial computing power in the model application phase. In some application domains, such as structural engineering, the longer run-times in the model application phase may be acceptable. In other application domains with fast-changing inputs, such as air pollution forecasting and weather forecasting, the longer run-times in the model application phase may be less than acceptable.

By way of example, weather and air pollution data can lead to complex nonlinear classification problems in very high dimensions, which can render naive machine-learning approaches such as simple linear classifiers ineffective. A large volume of data can facilitate the use of advanced learning algorithms such as, for example, deep artificial neural networks (ANN). While deep-learning techniques can be applied to physical models (e.g., transport models, weather models, or pollution models), application of deep-learning techniques to such physical models generally do not reach the level of success observed in other applications, such as in the field of the image classification, speech recognition, and other problems processing unstructured high-dimensional data. Thus, deep-learning techniques can be applied to physical models reducing the run-time of the model application phase, but at a cost of increasing the run-time of the model training phase.

In one aspect, deep neural networks (DNNs) can be applied to PDE-based models and use neural networks with PDE-based models in a variety of applications. A solver for PDEs can be used to obtain hundreds of thousands of outputs of a PDE solver for hundreds of thousands of inputs. The DNN can be used as means of non-linear regression between the inputs and outputs. In particular, a convolutional neural network (CNN) and long short-term memory (LSTM) units can be applied within a recurrent neural network (RNN). In a more abstract setting, the use of mesh-free DNN (e.g., deep Galerkin methods) can also be employed.

However, the applications of DNN have been limited in scale to the domains that have been tractable for the traditional solver for PDEs. For example, in pollution monitoring using machine learning, consider a coarse (0.25 degree resolution) grid of a selected area, with more than two years of air quality measurement and meteorological data, without any further insights, such as pollution sources, surface roughness, the reaction model, the multi-resolution aspects, or similar. A joint model can be analyzed and considered for feature extraction, interpolation, and prediction while employing the information pertaining to the unlabeled spatio-temporal data to improve the performance of the predictions. However, such approaches can use the measurement data without regard to the physics, which limits their performance, given the sparsity and costs of presently available sensors.

Moreover, an issue faced by applications of deep-learning techniques to physical models is scalability. For example, it can be observed that a factor of 12,000 improvement in the speed of obtaining results comparable to that of a leading solver for the PDE, but because the model itself is utilized to train the deep-learning model, the deep-learning model does not scale beyond the domains that can be considered using a PDE-based model.

Moreover, PDE-based models are often only available for limited areas due to computational burden (e.g., Caline pollution forecasting model limited to 20 link sources and 20 receptors). Once each deep learning model is trained on the inputs of multiple meshes of the PDE-based model(s), there are no guarantees of consistency across the meshes, hence a need exists to ensure such consistency. The consistency problems inevitably arise from the different physical models used and designed for different geographic areas with a variety of data sources available (e.g., consistency across grids for air pollution, across models and grids for weather conditions, across urban as compared to highway networks such as, for example, different flux functions—for traffic conditions).

FIG. 1 illustrates a block diagram of an example, non-limiting system 100 that can facilitate deep learning model rescaling by computing devices, in accordance with one or more embodiments described herein. System 100 includes memory 110 for storing computer-executable components and one or more processors 120 operably coupled via one or more communication busses 130 to memory 110 for executing the computer-executable components stored in memory 110. As shown in FIG. 1, the computer-executable components can include: rescaling component 140; and forecasting component 150.

Rescaling component 140 can determine a scaling ratio that maps output data of a partial differential equation (PDE)-based model at low mesh resolution for a sub-domain to high-resolution observational or ground-truth data for a domain comprising the sub-domain. In an embodiment, rescaling component 140 can determine a plurality of scaling ratios that map output data of different PDE-based models for different sub-domains at different mesh resolutions to the high-resolution observational or ground-truth data.

Forecasting component 150 can generate predictive output data at high mesh resolution for the domain with a machine-learning model using input data of the PDE-based model and the scaling ratio. In an embodiment, forecasting component 150 can generate the predictive output data for the domain with the machine-learning model using input data for a plurality of PDE-based models at different mesh resolutions for different sub-domains comprising the domain In an embodiment, the computer-executable components stored in memory 110 can further include: concatenation component 160; and training component 170. Concatenation component 160 can generate consistency constraints to enforce neighboring synchronization at interfaces between different sub-domains comprising the domain. In an embodiment, the consistency constraints can include: consistency constraints from a high mesh resolution PDE-based model; consistency constraints from a low mesh resolution PDE-based model; consistency constraints from adjacent tiles of a common mesh resolution PDE-based model; or a combination thereof. In an embodiment, the consistency constraints can define bounds on output values by the PDE-based model at selected points, bounds on a modulus of continuity, bounds on sub-gradients, bounds on a sum of sub-gradients across a tile of predictive output data, or a combination thereof. In an embodiment, concatenation component 160 can generate the consistency constraints using sensor data corresponding to the domain, a total variance across a patch of a mesh, or a combination thereof.

Training component 170 can employ machine learning to train the machine-learning model using a data set comprising historical input-output pairs of the PDE-based model. In an embodiment, the data set can further comprise additional inputs generated by the machine-learning model. The functionality of the computer-executable components utilized by the embodiments will be covered in greater detail below.

Figure 2:
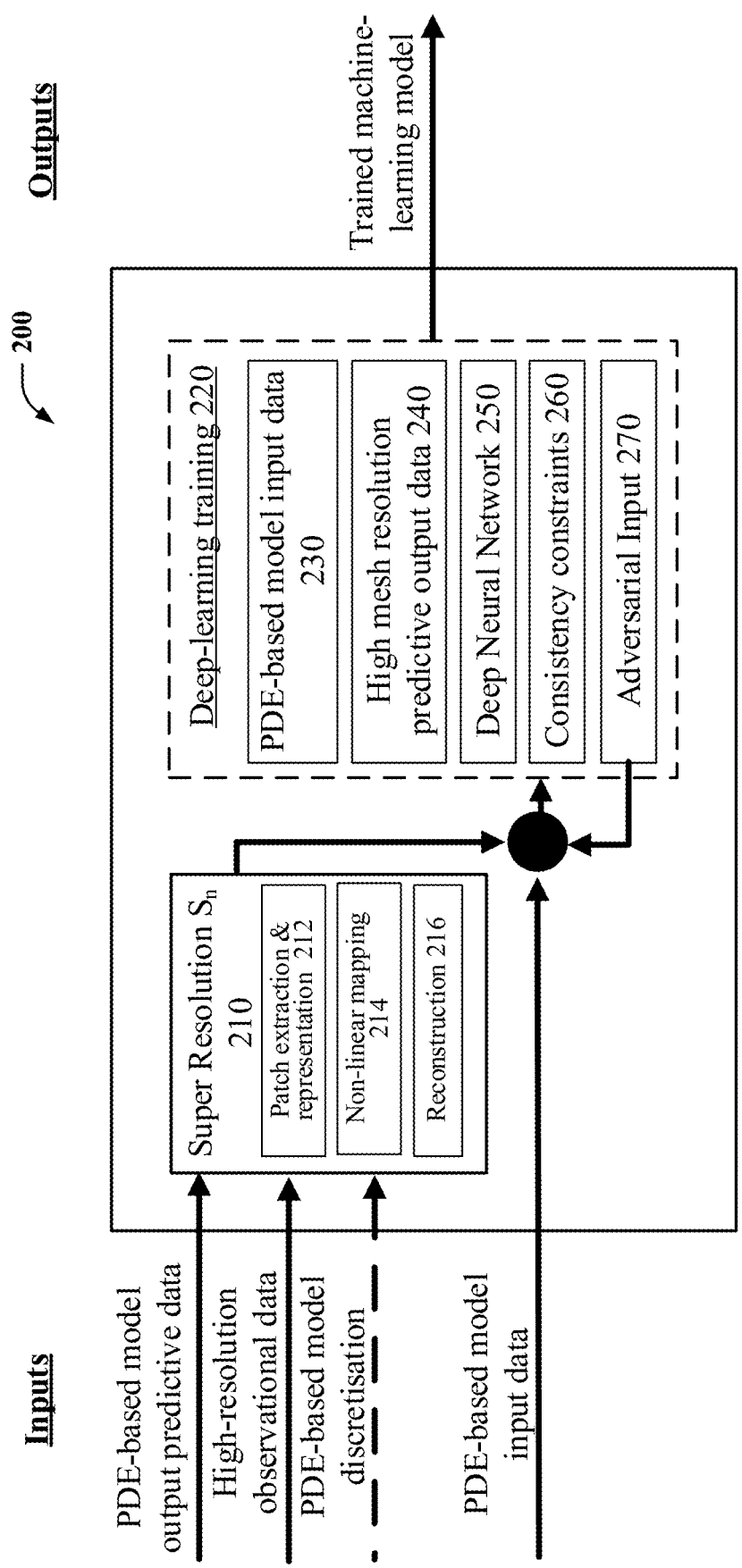
FIG. 2 illustrates an example, non-limiting model training phase, in accordance with one or more embodiments described herein.

FIG. 2 illustrates an example, non-limiting model training phase 200, in accordance with one or more embodiments described herein. The following description discusses one or more embodiments of the present disclosure in the context of spatio-temporal weather forecasting. However, one skilled in the art will appreciate that embodiments of the present disclosure can be implemented in other contexts. For example, embodiments of the present disclosure can facilitate spatio-temporal forecasting with respect to: air pollution, oceanic engineering, chemistry, finance, and other applications.

As shown by FIG. 2, inputs to model training phase 200 can include: predictive data [$Y_n$] output by n PDE-based models; high-resolution observational or ground-truth data; and input data [$X_n$] of the n PDE-based models. By way of example in which an application domain is weather forecasting, the input data, [$X_n$], of the n PDE-based models can include: initial weather-related conditions, lateral boundary conditions, turbulence diffusion parameters, and other data concerning weather-related parameters. In an embodiment, the inputs to model training phase 200 comprise historical data associated with the n PDE-based models. In an embodiment, the inputs to model training phase 200 also optionally include discretizations (or resolutions) of the n PDE-based models. In an embodiment, the n PDE-based models include one PDE-based model. In an embodiment, the n PDE-based models include two or more PDE-based models.

Figure 4:
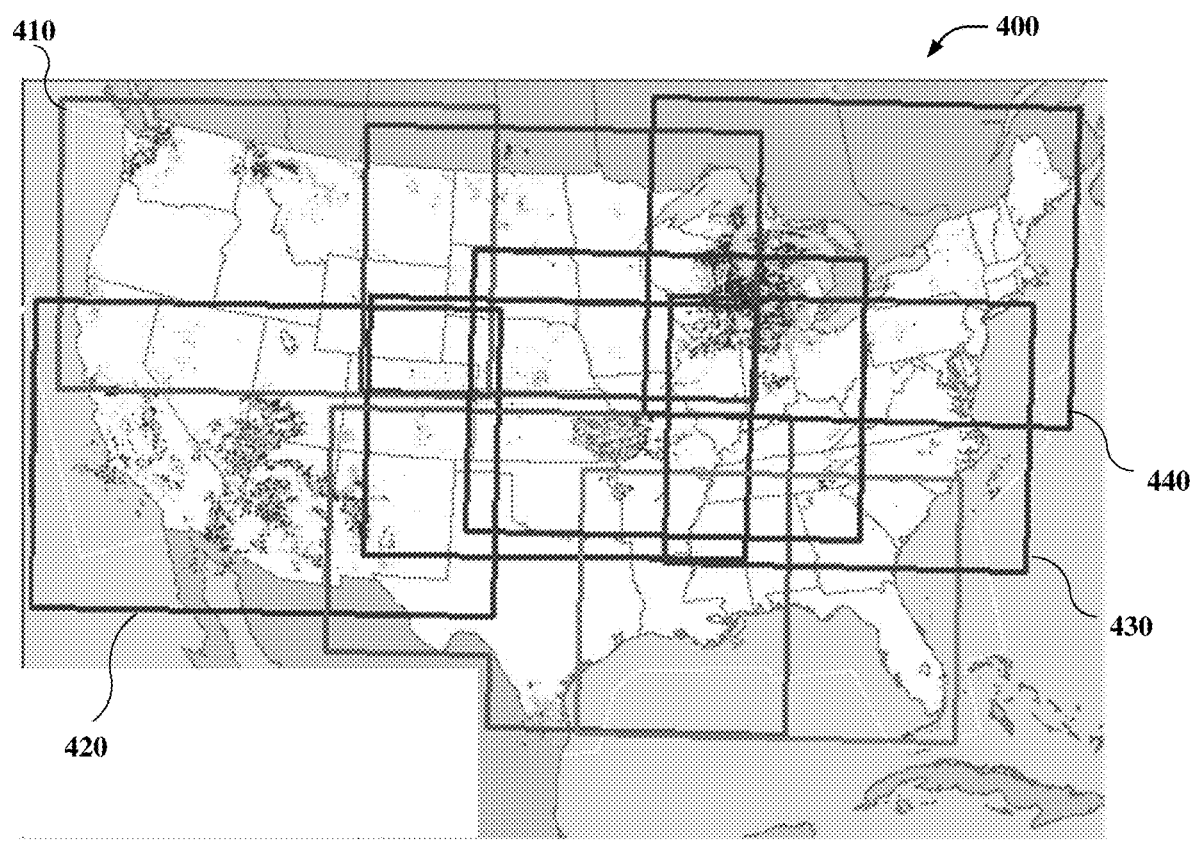
FIG. 4 illustrates example, non-limiting output data of multiple partial differential equation (PDE)-based models encompassing a domain, in accordance with one or more embodiments described herein.

With reference to FIG. 4, each PDE-based model among the n PDE-based models can output predictive data [$Y_n$] for a particular sub-domain based on input data that PDE-based model receives concerning the particular sub-domain. Continuing with the example above in which the application is weather forecasting, predictive weather data for a large domain 400 (e.g., the United States) can comprise an aggregation of predictive weather data for different sub-domains encompassing the larger domain 400. In FIG. 4, the different sub-domains include: a sub-domain 410 comprising a northwestern region of the United States; a sub-domain 420 comprising a southwestern region of the United States; a sub-domain 430 comprising a southeastern region of the United States; and a sub-domain 440 comprising a northeastern region of the United States.

Each PDE-based model among the n PDE-based models can be a machine-learning model trained to output predictive weather data for a particular sub-domain based on input data corresponding to that particular sub-domain. For example, one PDE-based model can be a machine-learning model trained to output predictive weather data for sub-domain 410 based on input data corresponding to sub-domain 410. As another example, another PDE-based model can be a machine-learning model trained to output predictive weather data for sub-domain 420 based on input data corresponding to sub-domain 420.

In an embodiment, different PDE-based models among the n PDE-based models of FIG. 4 can output predictive weather data at different mesh resolutions. For example, a first PDE-based model associated with sub-domain 410 can be trained to output predictive data for sub-domain 410 at a first mesh resolution and a second PDE-based model associated with sub-domain 420 can be trained to output predictive data for sub-domain 420 at a second mesh resolution. In this example, the first mesh resolution can be a mesh resolution of approximately 10 kilometers (km) whereas the second mesh resolution can be a mesh resolution of approximately 15 km. Various embodiments described herein facilitate providing non-linear spatio-temporal forecasting models that apply consistency constraints to concatenate one or more PDE-based models with different configurations and/or predictive data outputs at different mesh resolutions.

To that end, a super resolution process $S_n$ 210 of the example model training phase of FIG. 2 can receive as input predictive data output by a PDE-based model for a sub-domain and high-resolution observational or ground-truth data for a domain (e.g., domain 400) comprising the sub-domain (e.g., sub-domain 410). Examples of high-resolution observational or ground-truth data include: satellite data; radar data; reanalysis gridded data; National Centers for Environmental Prediction (NCEP) daily gridded data; and the like. In an embodiment, the predictive data output by the PDE-based model is at a low mesh resolution having a lower resolution than the high-resolution observational or ground-truth data. Super resolution process $S_n$ 210 can determine a scaling ratio that maps the predictive data output by the PDE-based model to the high-resolution observational or ground-truth data.

As shown by FIG. 2, super resolution process $S_n$ 210 can comprise: a patch extraction and representation sub-process 212; a non-linear mapping sub-process 214; and/or a reconstruction sub-process 216. Patch extraction and representation sub-process 212 can comprise extracting patches (e.g., overlapping patches) from the predictive data [Y] output by the PDE-based model. Patch extraction and representation sub-process 212 can further comprise representing each extracted patch as a high-dimensional vector. Each high-dimensional vector can comprise a set of feature maps. Each set of feature maps can be of a number that equals a dimensionality of the high-dimensional vector.

Non-linear mapping sub-process 214 can comprise non-linearly mapping each high-dimensional vector onto another high-dimensional vector from the high-resolution observational or ground-truth data. Each non-linearly mapped vector can be a representation of a high-resolution patch and can comprise another set of feature maps. Reconstruction sub-process 216 can comprise aggregating the high-resolution patch-wise representations corresponding to each non-linearly mapped vector from non-linear mapping sub-process 214 to generate high mesh resolution predictive data [$Y^H$] for the sub-domain. In an embodiment, the high mesh resolution predictive data [$Y^H$] can be compared to corresponding high-resolution observational or ground-truth data to train a machine-learning model.

Figure 6:
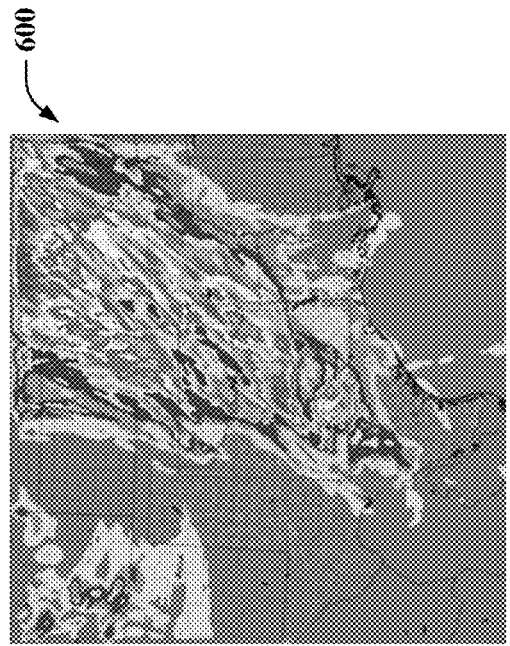
FIG. 6 illustrates example, non-limiting high-resolution observational or ground-truth data for a domain comprising the sub-domain of FIG. 5, in accordance with one or more embodiments described herein.
Figure 7:
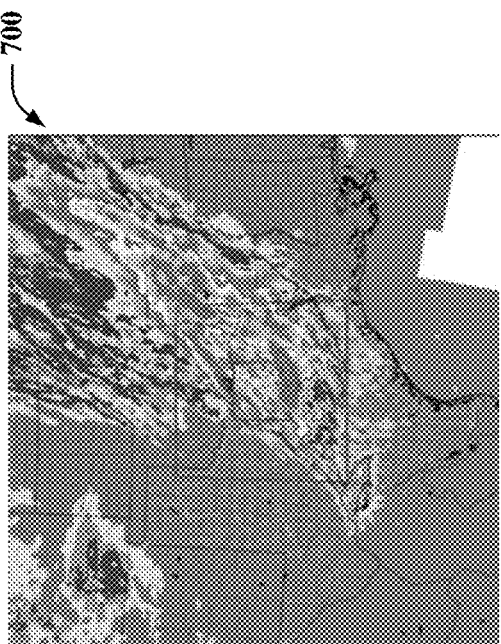
FIG. 7 illustrates example, non-limiting high-resolution predictive data for the domain of FIG. 6, in accordance with one or more embodiments described herein.
Figure 5:
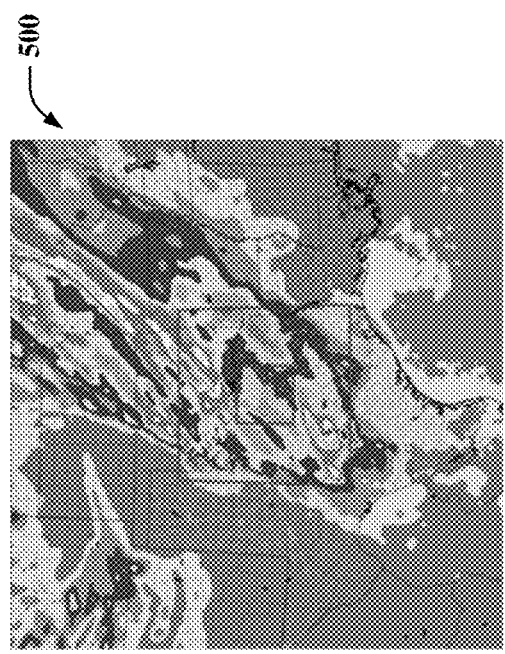
FIG. 5 illustrates example, non-limiting low-resolution predictive data output by a PDE-based model for a sub-domain, in accordance with one or more embodiments described herein.

In an embodiment, the high mesh resolution predictive data [$Y^H$] for the sub-domain can comprise image data. For example, super resolution process $S_n$ 210 can receive low-resolution predictive data 500 output by a PDE-based model for a sub-domain as depicted by FIG. 5. Patch extraction and representation sub-process 212 of super resolution process $S_n$ 210 can extract patches (e.g., overlapping patches) from the low-resolution predictive data 500 and represent each extracted patch as a high-dimensional vector. Non-linear mapping sub-process 214 of super resolution process $S_n$ 210 can non-linearly map each high-dimensional vector onto another high-dimensional vector from high-resolution observational or ground-truth data, such as the example high-resolution observational or ground-truth data 600 depicted by FIG. 6. Reconstruction sub-process 216 can aggregate the high-resolution patch-wise representations corresponding to each non-linearly mapped vector from non-linear mapping sub-process 214 to generate high mesh resolution predictive data for the sub-domain, such as the example high mesh resolution predictive data 700 depicted by FIG. 7.

In an embodiment, super resolution process $S_n$ 210 can be applied to predictive data [$Y_n$] output by n PDE-based models encompassing a domain and high-resolution observational or ground-truth data for the domain. In an embodiment, super resolution process $S_n$ 210 can output high mesh resolution predictive data [$Y_N^H$] corresponding to each model grid of the n PDE-based models. In this embodiment, the output high mesh resolution predictive data can be represented as [$Y_1^H, Y_2^H, \ldots, Y_N^H$] where $Y_1^H$ corresponds to high mesh resolution predictive data for a first sub-domain of the domain and $Y_2^H$ corresponds to high mesh resolution predictive data for a second sub-domain of the domain. In an embodiment, super resolution process $S_n$ 210 can determine n scaling ratios that each map predictive data output by a given PDE-based model among the n PDE-based models to the high-resolution observational or ground-truth data.

Model training phase 200 further comprises a deep-learning training process 220 that outputs a trained non-linear machine-learning model that generates predictive data for a domain (e.g., domain 400 of FIG. 4) using input data of one or more PDE-based models and corresponding scaling ratios determined by super resolution process $S_n$ 210. To that end, deep-learning training process 220 can populate a data set comprising historical input-output pairs of the one or more PDE-based models. PDE-based model input data 230 and corresponding high mesh resolution predictive data 240 generated by super resolution process $S_n$ 210 from the data set can be iteratively input to deep neural network 250, as features and labels, respectively. In an embodiment, deep neural network 250 can comprise a convolutional neural network (CNN), a long short-term memory (LSTM) network, a recurrent neural network (RNN), or a combination thereof. In an embodiment, deep-learning training process 220 can populate the data set with input-output pairs of multiple PDE-based models at different horizontal resolutions.

A non-linear regression can be obtained after a number of training epochs between the PDE-based model input data 230 and corresponding high mesh resolution predictive data 240. In an embodiment, the data set can further comprise additional inputs for training, based on a sensitivity analysis of the non-linear regression, seen as an optimization problem, in the spirit of adversarial robustness (e.g., adversarial input 270). With such additional inputs, the non-linear regression may be recomputed and continue until a certain criterion is satisfied such as, for example, upon expiration of a time limit. Eventually, a trained non-linear machine-learning model can be output that can transformation of the inputs to the outputs, and consistency constraints to use by further runs of the operations on the same mesh (grid), adjacent meshes at the same resolution, overlapping meshes at a different resolution, or completely different (multi-physics) PDE-based models at adjacent or overlapping meshes.

After each iteration, deep-learning training process 220 can update one or more consistency constraints 260 to enforce neighboring synchronization at interfaces between different sub-domains. In an embodiment, the one or more consistency constraints 260 can be defined such that predictive data output by one PDE-based model constrains predictive data output by another PDE-based model. To that end, consistency constraints aim to ensure physically meaningful results at an interface (or boundary) between different PDE-based model outputs by minimizing differences in respective predictive data values at the interface.

Figure 8:
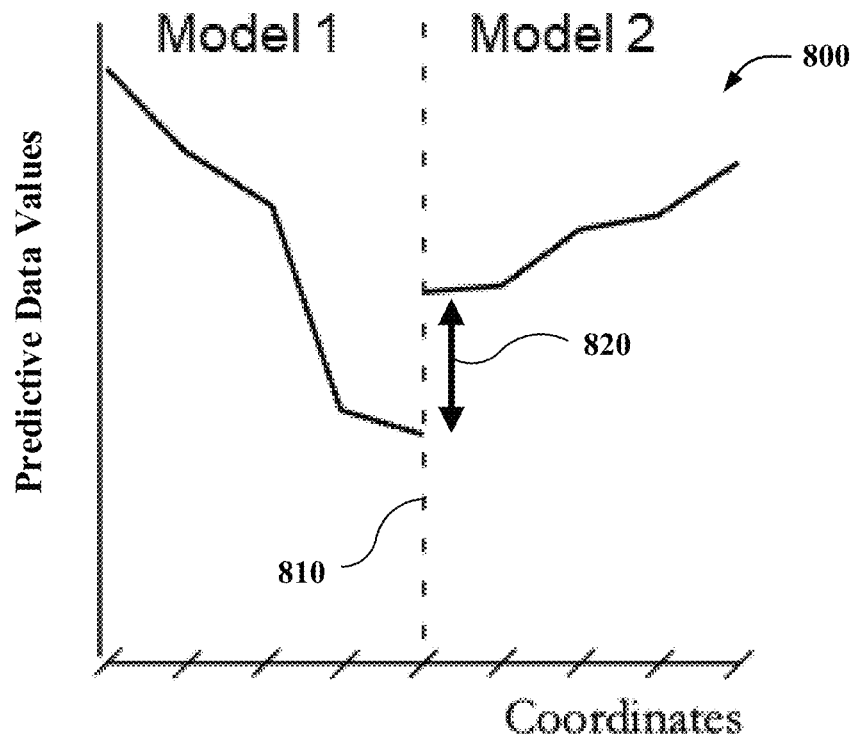
FIG. 8 illustrates an example, non-limiting graph depicting a discrepancy in predictive data at an interface between different sub-domains of a domain, in accordance with one or more embodiments described herein.
Figure 9:
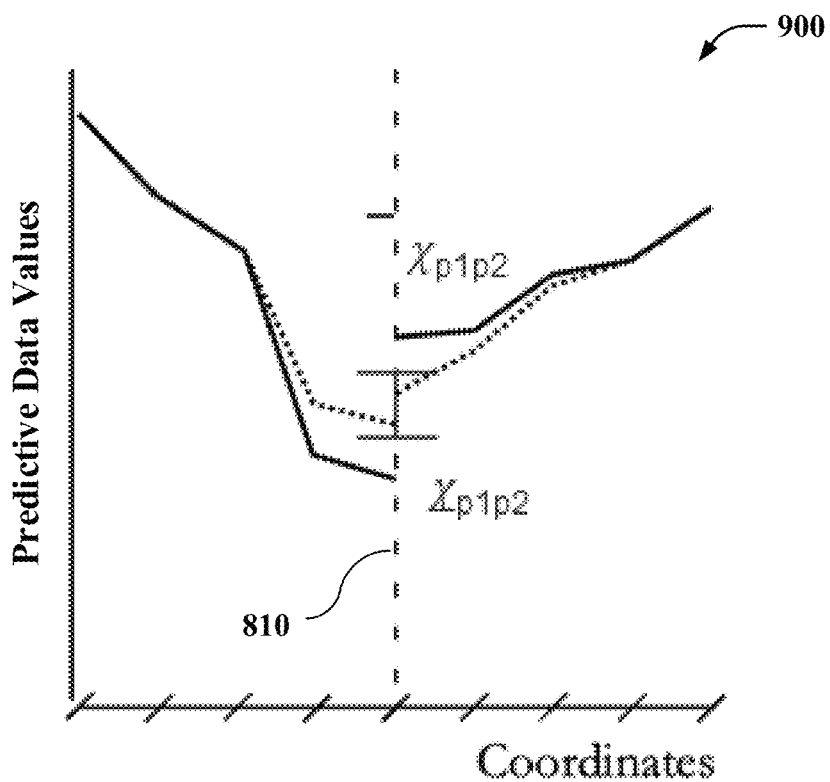
FIG. 9 illustrates an example, non-limiting graph depicting consistency constraints enforcing neighboring synchronization at the interface of FIG. 8, in accordance with one or more embodiments described herein.

By way of example, graph 800 of FIG. 8 depicts predictive data values output by different PDE-based models at an interface 810 between respective sub-domains of each PDE-based model. As shown by FIG. 8, a first PDE-based model (designated as Model 1) and a second PDE-based model (designated as Model 2) output different predictive data values for the interface 810. A difference between the respective predictive data values define a discrepancy 820 between the first PDE-based model and the second PDE-based model. During a subsequent training iteration, deep-learning training process 220 can update one or more consistency constraints 260 at interface 810 such that the respective predictive data values output by the first and second PDE-based models converge as shown by FIG. 9.

Iteratively updating consistency constraints facilitates a smoothness of a predicted data value field across patch boundaries. As used herein, "smooth" at a point or across a line at a border of two patches means that 1) the predicted values at a point or a line for each of those patches may coincide or lay numerically close to each other, and 2) that gradients exist at all points and that their magnitude is small. In an additional aspect, "smooth" is a statement about all higher derivatives of the function as well, but only the first derivatives may be considered. Such operations may be for setting boundary conditions as consistency constraints may be used but may also be applied to 1) patching of two tiles and/or 2) changing the resolution of the mesh. In one aspect, consistency constraints can be introduced, as follows: 1) patching (across neighboring mesh tiles), 2) zooming (by changing mesh resolution), and/or 2) merging (across different PDE-based models) which could be seen from a constrained-backpropagation viewpoint.

In an embodiment, a description of the consistency constraints 260, both in terms of the symbolic representation and the constants to use therein at each boundary can be provided as input to deep-learning training process 220. The symbolic representation of the consistency constraints may comprise a bound on the modulus of continuity or a bound on a norm of a sub-gradient, for example. The constants may be derived from uncertainty in PDE-based model input data 230, total variation of high mesh resolution predictive data associated with previous training iterations, or similar.

Figure 3:
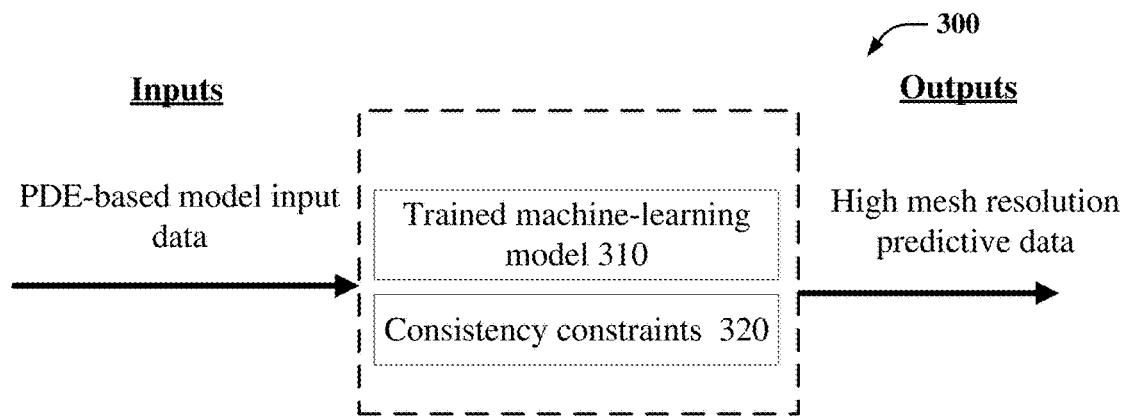
FIG. 3 illustrates an example, non-limiting model deployment phase, in accordance with one or more embodiments described herein.

FIG. 3 illustrates an example, non-limiting model deployment phase 300, in accordance with one or more embodiments described herein. As shown by FIG. 3, a trained machine-learning model 310 output by model training phase 200 can output high mesh resolution predictive data for a domain using input data of a PDE-based model for a sub-domain of the domain received as input. Consistency constraints 320 generated during model training phase 200 can synchronize predictive data values at boundaries to ensure the solutions are physically meaningful even at the boundaries.

Figure 10:
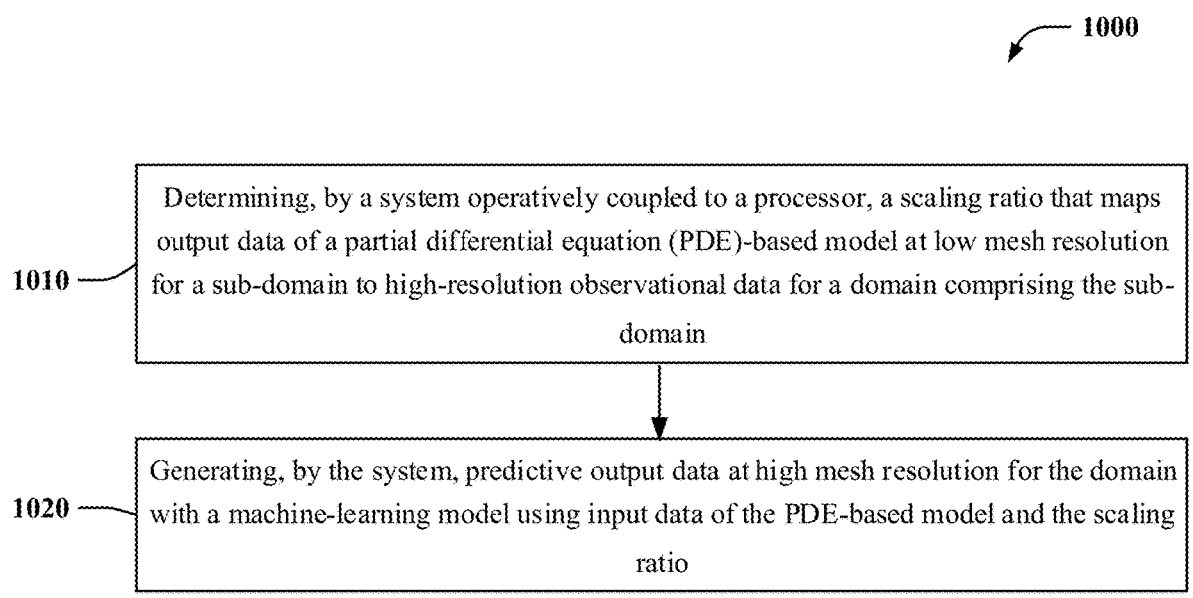
FIG. 10 illustrates a flow diagram of an example, non-limiting computer-implemented method of facilitating deep learning model rescaling, in accordance with one or more embodiments described herein.

FIG. 10 illustrates a flow diagram of an example, non-limiting computer-implemented method 1000 of facilitating deep learning model rescaling by computing devices, in accordance with one or more embodiments described herein. Repetitive description of like elements employed in other embodiments described herein is omitted for sake of brevity. At 1010, the computer-implemented method 1000 can comprise determining (e.g., with rescaling component 140), by a system operatively coupled to a processor, a scaling ratio that maps low mesh resolution predictive data output by a PDE-based model at for a sub-domain to high-resolution observational or ground-truth data for a domain comprising the sub-domain. In an embodiment, the system can determine a plurality of scaling ratios that map predictive data output by different PDE-based models for different sub-domains at different mesh resolutions to the high-resolution observational or ground-truth data.

At 1020, the computer-implemented method 1000 can comprise generating, by the system (e.g., with forecasting component 150), high mesh resolution predictive data for the domain with a machine-learning model using input data of the PDE-based model and the scaling ratio. In an embodiment, the system can generate the high mesh resolution predictive data for the domain with the machine-learning model using input data for a plurality of PDE-based models at different mesh resolutions for different sub-domains comprising the domain.

In an embodiment, the computer-implemented method 1000 can further comprise: generating, by the system (e.g., with concatenation component 160), consistency constraints to enforce neighboring synchronization at interfaces between different sub-domains comprising the domain. In an embodiment, the consistency constraints can include: consistency constraints from a high mesh resolution PDE-based model; consistency constraints from a low mesh resolution PDE-based model; consistency constraints from adjacent tiles of a common mesh resolution PDE-based model; or a combination thereof. In an embodiment, the consistency constraints can define bounds on high mesh resolution predictive data values output by the machine-learning model at selected points, bounds on a modulus of continuity, bounds on sub-gradients, bounds on a sum of sub-gradients across a tile of predictive data, or a combination thereof. In an embodiment, the system can generate the consistency constraints using sensor data corresponding to the domain, a total variance across a patch of a mesh, or a combination thereof.

In an embodiment, the computer-implemented method 1000 can further comprise: employing, by the system (e.g., with training component 170), machine learning to train the machine-learning model using a data set comprising historical input-output pairs of the PDE-based model, additional inputs generated by the machine-learning model, or a combination thereof.

Figure 11:
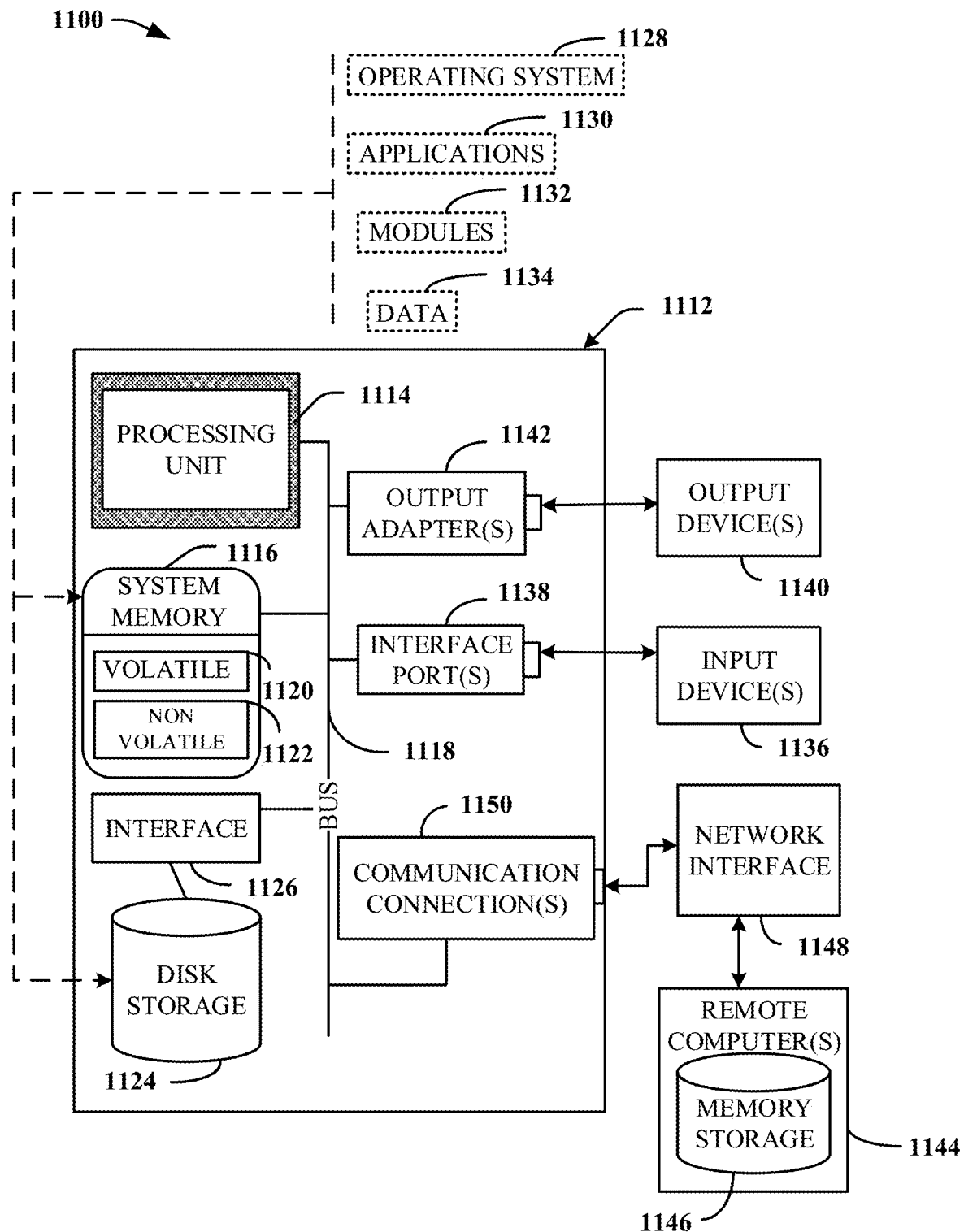
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112. System applications 1130 take advantage of the management of resources by operating system 1128 through program modules 1132 and program data 1134, e.g., stored either in system memory 916 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It can be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor-based appliance, a peer device or other common network node and the like, and typically can also include many or the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    at least one processor; and
    at least one memory that stores executable instructions that, when executed by the at least one processor, facilitate performance of operations, comprising:
    determining a scaling ratio that maps low mesh resolution predictive data output by a partial differential equation (PDE)-based model for a sub-domain to high-resolution observational or ground-truth data for a domain comprising the sub-domain,
    wherein determining the scaling ratio comprises:
        extracting patches, comprising overlapping boundaries, from the low mesh resolution predictive data and representing each extracting patch as a high-dimensional vector,
        non-linearly mapping each high-dimensional vector onto another high-dimensional vector from the high-resolution observational or ground-truth data, and
        aggregating high-resolution patch-wise representations corresponding to each non-linearly mapped vector to generate the high-resolution observational or ground-truth data; and
    generating high mesh resolution predictive data for the domain with a machine-learning model using input data of the PDE-based model and the scaling ratio.

2. The system of claim 1, wherein the operations further comprise:
    determining a plurality of scaling ratios that map predictive data output by different PDE-based models for different sub-domains at different mesh resolutions to the high-resolution observational or ground-truth data.

3. The system of claim 1, wherein the operations further comprise:
    generating the high mesh resolution predictive data for the domain with the machine-learning model using input data for a plurality of PDE-based models at different mesh resolutions for different sub-domains comprising the domain.

4. The system of claim 1, wherein the operations further comprise:
    generating consistency constraints to enforce neighboring synchronization at interfaces between different sub-domains comprising the domain.

5. The system of claim 4, wherein the consistency constraints include: consistency constraints from a high mesh resolution PDE-based model; consistency constraints from a low mesh resolution PDE-based model; consistency constraints from adjacent tiles of a common mesh resolution PDE-based model; or a combination thereof.

6. The system of claim 4, wherein the consistency constraints define bounds on high mesh resolution predictive data values output by the machine-learning model at selected points, bounds on a modulus of continuity, bounds on sub-gradients, bounds on a sum of sub-gradients across a tile of predictive data, or a combination thereof.

7. The system of claim 4, wherein the operations further comprise:
    generating the consistency constraints using sensor data corresponding to the domain, a total variance across a patch of a mesh, or a combination thereof.

8. The system of claim 1, wherein the operations further comprise:
    using machine learning to train the machine-learning model using a data set comprising historical input-output pairs of the PDE-based model.

9. The system of claim 8, wherein the data set further comprises additional inputs generated by the machine-learning model.

10. A computer-implemented method, comprising:
    determining, by a system operatively coupled to a processor, a scaling ratio that maps low mesh resolution predictive data output by a partial differential equation (PDE)-based model for a sub-domain to high-resolution observational or ground-truth data for a domain comprising the sub-domain,
    wherein determining the scaling ratio comprises:
        extracting patches, comprising overlapping boundaries, from the low mesh resolution predictive data and representing each extracting patch as a high-dimensional vector,
        non-linearly mapping each high-dimensional vector onto another high-dimensional vector from the high-resolution observational or ground-truth data, and
        aggregating high-resolution patch-wise representations corresponding to each non-linearly mapped vector to generate the high-resolution observational or ground-truth data; and generating, by the system, high mesh resolution predictive data for the domain with a machine-learning model using input data of the PDE-based model and the scaling ratio.

11. The computer-implemented method of claim 10, wherein the system determines a plurality of scaling ratios that map predictive data output by different PDE-based models for different sub-domains at different mesh resolutions to the high-resolution observational or ground-truth data.

12. The computer-implemented method of claim 10, wherein the system generates the high mesh resolution predictive data for the domain with the machine-learning model using input data for a plurality of PDE-based models at different mesh resolutions for different sub-domains comprising the domain.

13. The computer-implemented method of claim 10, further comprising:
 generating, by the system, consistency constraints to enforce neighboring synchronization at interfaces between different sub-domains comprising the domain.

14. The computer-implemented method of claim 13, wherein the consistency constraints include: consistency constraints from a high mesh resolution PDE-based model; consistency constraints from a low mesh resolution PDE-based model; consistency constraints from adjacent tiles of a common mesh resolution PDE-based model; or a combination thereof.

15. The computer-implemented method of claim 13, wherein the consistency constraints define bounds on high mesh resolution predictive data values output by the machine-learning model at selected points, bounds on a modulus of continuity, bounds on sub-gradients, bounds on a sum of sub-gradients across a tile of predictive data, or a combination thereof.

16. The computer-implemented method of claim 13, wherein the system generates the consistency constraints using sensor data corresponding to the domain, a total variance across a patch of a mesh, or a combination thereof.

17. The computer-implemented method of claim 10, further comprising:
 employing, by the system, machine learning to train the machine-learning model using a data set comprising historical input-output pairs of the PDE-based model, additional inputs generated by the machine-learning model, or a combination thereof.

18. A computer program product comprising a computer readable storage medium having program instructions embodied therewith, the program instructions executable by a processor to cause the processor to:
 determine, by the processor, a scaling ratio that maps low mesh resolution predictive data output by a partial differential equation (PDE)-based model for a sub-domain to high-resolution observational or ground-truth data for a domain comprising the sub-domain,
 wherein determining the scaling ratio comprises:
  extracting patches, comprising overlapping boundaries, from the low mesh resolution predictive data and representing each extracting patch as a high-dimensional vector,
  non-linearly mapping each high-dimensional vector onto another high-dimensional vector from the high-resolution observational or ground-truth data, and
  aggregating high-resolution patch-wise representations corresponding to each non-linearly mapped vector to generate the high-resolution observational or ground-truth data; and
 generate, by the processor, high resolution predictive data for the domain with a machine-learning model using input data of the PDE-based model and the scaling ratio.

19. The computer program product of claim 18, the program instructions executable by the processor to further cause the processor to:
 determine, by the processor, a plurality of scaling ratios that map predictive data output by different PDE-based models for different sub-domains at different mesh resolutions to the high-resolution observational or ground-truth data.

20. The computer program product of claim 18, the program instructions executable by the processor to further cause the processor to:
generate, by the processor, the high mesh resolution predictive data for the domain with the machine-learning model using input data for a plurality of PDE-based models at different mesh resolutions for different sub-domains comprising the domain.

* * * * *